(12) United States Patent
Orr

(10) Patent No.: US 7,362,816 B1
(45) Date of Patent: Apr. 22, 2008

(54) INVERSION OF CHANNEL DISTORTION BY ADAPTIVE WAVELET LIFTING

(75) Inventor: David E. Orr, Vancouver, WA (US)

(73) Assignee: Xtendwave, Inc., Dallas, TX (US)

(*) Notice: Subject to any disclaimer, the term of this patent is extended or adjusted under 35 U.S.C. 154(b) by 790 days.

(21) Appl. No.: 10/425,019

(22) Filed: Apr. 28, 2003

(51) Int. Cl.
*H04B 15/00* (2006.01)

(52) U.S. Cl. .............. 375/285; 375/296; 375/350; 375/358; 375/346; 348/240.99; 708/300

(58) Field of Classification Search ............ 375/295, 375/296, 316, 350, 377, 229, 230, 233, 234, 375/358, 285, 346, 240; 708/300; 348/240
See application file for complete search history.

(56) References Cited

U.S. PATENT DOCUMENTS

| | | | |
|---|---|---|---|
| 5,420,891 A * | 5/1995 | Akansu ................ 375/350 |
| 5,943,367 A * | 8/1999 | Theunis ................ 375/285 |
| 6,456,657 B1 * | 9/2002 | Yeap et al. ............ 375/240.12 |
| 6,532,256 B2 * | 3/2003 | Miller ................ 375/222 |
| 6,735,264 B2 * | 5/2004 | Miller ................ 375/340 |
| 6,751,277 B1 * | 6/2004 | Pesquet-Popescu ...... 375/350 |
| 6,757,326 B1 * | 6/2004 | Prieto et al. .......... 375/232 |
| 6,885,338 B2 * | 4/2005 | Gaus et al. ........... 342/377 |
| 7,068,851 B1 * | 6/2006 | Berkner ............... 382/261 |
| 7,072,412 B1 * | 7/2006 | Bellanger et al. ....... 375/261 |

* cited by examiner

*Primary Examiner*—Chieh M. Fan
*Assistant Examiner*—Siu M Lee
(74) *Attorney, Agent, or Firm*—Merchant & Gould, PC; Stanley J. Gradisar

(57) ABSTRACT

A method for inverting telecommunication channel distortion by adaptive wavelet lifting. The distortion signal is analyzed using wavelet lifting and the inverse filter is computed. Coefficients of the inverse filter are used to either compute a transmission pre-filter or to update the transmitted message.

1 Claim, 6 Drawing Sheets

*P* – prediction operator; *U* – update operator; *P* and *U* may be linear or non-linear Software 280 implementing wavelet lifting methods, and signal analysis

Figure 3

```
function [s,d] = Haar(Signal)
%  Determine the length of the signal.
N = length(Signal);
% Allocate memory.
s = zeros(1, N/2);
d = s;
%
%  Haar decomposition
%.
for n=1:N/2
    s(n) = 1/2*(Signal(2*n-1) + Signal(2*n));
    d(n) = Signal(2*n-1) - s(n);
end function T = HaarTransform(Signal)
N = size(Signal,2);
K = log2(N);
%
if rem(K,1)
    error(Signal must be of length power of two!);
end
%
T = zeros(K, N);
T(1,:) = Signal;
%
for j=1:K
    Length = 2~(J+1-j);
    T(j+1, 1:Length)= Haar( T(j, 1:Length) );
    T(j+1, Length+1:N) = T(j, Length+1:N);~
end
```

Figure 4

```
function [s,d] = Daubechies(S)
s1 = S(1:2:N-1) + sqrt(3)*S(2:2:N);
d1 = S(2:2:N) - sqrt(3)/4*s1 - (sqrt(3)-2)/4*[s1(N/2) s1(1:N/2-1)];
s2 = s1 - [d1(2:N/2) d1(1)];
s = (sqrt(3)-1)/sqrt(2) * s2;
d = (sqrt(3)+1)/sqrt(2) * d1;

function S = InvDaubechies(s,d)
d1 = d / ((sqrt(3)+1)/sqrt(2));
s2 = s / ((sqrt(3)-1)/sqrt(2));
s1 = s2 + cpv(d1,1);
S(2:2:n) =~S1^ sqrt(3)/4*s1 + (sqrt(3)-2)/4*cpv(s1,-1)
S(1:2:N-1) = s1 - sqrt(3)*S(2:2:N);
```

INVERSION OF CHANNEL DISTORTION BY ADAPTIVE WAVELET LIFTING

BACKGROUND

1. Field of the Invention

The invention relates to methods for encoding and transmitting data or information; more specifically the invention is a method for inverting distortion processes in a telecommunication channel.

2. Current Art and Problem Solution Needed

Recent information technology advancements such as real-time multimedia applications and high-speed Internet access, as well as the integration of common communications means such as telephone, Internet, television, and digital data systems have led to an unprecedented need for high-speed data transfer. However, many segments of today's wired networks are incapable of supporting the transfer rates required by these technologies. In many cases, it is impractical, both physically and economically, to install the necessary fiber optic and other broadband infrastructures to overcome this deficiency. Furthermore, in certain circumstances such as emergencies and military operations requiring high-speed data transfer, there exists an inherent need for rapid and temporary network access deployment, precluding fiber and traditional wireless systems, which have rather long lead-times.

An examination of existing legacy landline communications networks in light of communications technology evolution leads to some interesting observations. On the one hand, the newest long haul communications and information infrastructures being built today are based on fiber optic and coding technologies that are capable of immense capacity. On the other hand, the "last mile" local drop to the end user is typically still the legacy copper line installed decades ago for telephone service. Because the legacy copper lines were designed for performance that did not contemplate today's fiber optic capabilities, present copper line technologies cannot avail end users of the high bit rates that modern long haul infrastructure can provide. The user is limited by his local drop connection to the service provider.

Looking at the communications system architectures currently being pursued by service providers, nearly all suffer from implicit assumptions that preserve the notion of connection-based service.

The use of telecommunication resources has moved well beyond mere telephone calls. These voice communications messages are no longer the dominant kind of information flowing through the world's communication networks. Telecommunication users today utilize these resources for many other forms of information. Computer data and video are just examples of the future. Users are requiring that their communication link to the global networks rise to the occasion in terms of bandwidth, that is, digital data rate capability. The legacy links as well as the architecture of the central office (telephone exchange) and its cable to the user cannot deliver the information capability desired for all this data, video and other information. However, a somewhat recent development is the application of digital technology to legacy copper systems—a development variously designated as "xDSL."

xDSL is a generic term for digital subscriber line equipment and services, including packet-based architectures, such as ADSL, HDSL, SDSL, VDSL, and RADSL. That is, x is the generic. xDSL technologies provide extremely high bandwidth over embedded twisted pair, copper cable plant. xDSL technologies offer great potential for bandwidth-intensive applications, such as Internet access, remote LAN access, video conferencing, and video-on-demand.

ADSL or asymmetric digital subscriber line services generally use existing unshielded twisted pair (UTP) copper wires from the telephone company's central office to the subscriber's premise, utilize electronic equipment in the form of ADSL modems at both the central office and the subscriber's premise, send high-speed digital signals up and down those copper wires, and send more information one way than the other. The ADSL flavor of xDSL services is capable of providing a downstream bandwidth of about 1.5 Mbps-6.144 Mbps, and an upstream bandwidth of about 32 Kbps-640 Kbps with loop distances ranging from about 3.7 km-5.5 km. HDSL or high bit rate digital subscriber line services provide a symmetric, high-performance connection over a shorter loop, and typically require two or three copper twisted pairs. HDSL is capable of providing both upstream and downstream bandwidth of about 1.5 Mbps, over loop distances of up to about 3.7 km. SDSL or single line digital subscriber line services provide a symmetric connection that matches HDSL performance using a single twisted pair, but operating over a shorter loop of up to about 3.0 km. VDSL or very high bit rate digital subscriber line services are typically implemented in asymmetric form, as a very high speed variation on the ADSL theme over a very short loop. Specifically, target downstream performance is typically about 52 Mbps over UTP local loops of 300 m, 26 Mbps at 1,000 m, and 13 Mbps at 1,500 m. Upstream data rates in asymmetric implementations tend to range from about 1.6 Mbps to about 2.3 Mbps. Additionally, there is RADSL or rate adaptive digital subscriber line services. RADSL provides a dynamic connection that adapts to the length and quality of the line.

In the xDSL family of services, many xDSL themes, including ADSL, HDSL, SDSL, VDSL, and RADSL, utilize a packet-based approach that does away with the line-grabbing practice of circuit switched networks, such as ISDN (although ISDN service is a form of digital subscriber line). This packet-based approach is very advantageous in a variety of situations, such as high-speed data services, including high definition television or HDTV transmissions.

xDSL services, also commonly referred to as simply DSL or digital subscriber line services, are much more dependent on line conditions than traditional telephone services. Traditional telephone services typically use a bandwidth including frequencies up to about 3 kilohertz, while the DSL services utilize a bandwidth including frequencies up into the hundreds of kilohertz. While some local loops are in great condition for implementing DSL services, that is, the local loops have short to moderate lengths with minimal bridged taps and splices, many local loops are not as clean. For example, local loop length vary widely, for example, from as short as a few hundred meters to as long as several kilometers

SUMMARY

In response to the need for improved telecommunications systems that will transmit faster and more reliably, herein is disclosed a system and method for inverting noise and distortion encountered in the telecommunications channel and transmission equipment.

The system and method is disclosed comprising a transmitter and receiver using wavelets for constructing signals that, when transmitted by the transmitter, said signals are received by the receiver and are maximally discriminable by the receiver.

The system and method is disclosed comprising filter-banks for wavelets, whereby the filter-banks use the method of lifting to construct signals that are maximally discriminable by the receiver.

A first aspect of the system and method is disclosed comprising an apparatus that implements the following process: (1) with a message, the transmitter using a first filter bank and wavelet lifting, constructs a signal from the message, and sends the signal to the receiver, wherein the signal sent by the transmitter is known to the receiver; (2) the receiver receives the signal and compares the signal to an expected signal, to form a novelty signal, wherein the expected signal is the signal known to the receiver, and has been distorted by the channel in a manner that is expected by the receiver; if the novelty signal is sufficiently small, the receiver notifies the transmitter and the transmitter and receiver utilize the first signal to communicate; if the novelty signal is greater than a predetermined signal, the apparatus processes signals according to the following: (3) the receiver, using a second wavelet filter bank (an analysis filter bank) that is known to the transmitter, computes the coefficients that are required to represent the novelty signal in terms of the second filter bank; the receiver computes the coefficients of the synthesis filter bank that is related to the second filter bank, whereby the synthesis filter bank is the inverse filter bank to the second filter bank; (4) the receiver sends the coefficients of the inverse filter bank to the transmitter; (5) the transmitter computes an updated first filter bank using the previous first filter bank and the coefficients of the inverse of the second filter bank; (6) the transmitter, using the updated filter bank and the process of lifting, constructs an updated signal and sends the updated signal to the receiver; (7) the updated signal is processed according to (2), above.

A second aspect of the system and method is disclosed comprising an apparatus that implements the following process: (1) with a message, the transmitter using a first filter bank and wavelet lifting, constructs a signal, and sends the signal to the receiver, wherein the signal sent by the transmitter is known to the receiver; (2) the receiver receives the signal and compares the signal to an expected signal, to form a novelty signal, wherein the expected signal is the signal known to the receiver, and has been distorted by the channel in a manner that is expected by the receiver; if the novelty signal is sufficiently small, the receiver notifies the transmitter and the transmitter and receiver utilize the first signal to communicate; if the novelty signal is greater than a predetermined signal, the apparatus processes signals according to the following: (3) the receiver, using a second wavelet filter bank (an analysis filter bank) that is known to the transmitter, computes the coefficients that are required to represent the novelty signal in terms of the second filter bank; the receiver computes the coefficients of the synthesis filter bank that is related to the second filter bank, whereby the synthesis filter bank is the inverse filter bank to the second filter bank; (4) the receiver sends the coefficients of the inverse filter bank to the transmitter; (5) the transmitter computes an updated message using the previous first filter bank and the coefficients of the inverse of the second filter bank; (6) the transmitter, using the updated message, the first filter bank and the process of lifting, constructs an updated signal and sends the updated signal to the receiver; (7) the updated signal is processed according to (2), above.

A variant of either the first aspect or the second aspect of the system and method described above is for all filter bank processing to be performed in the transmitter, whereby the receiver computes and transmits the novelty signal to the transmitter.

Another variant of either the first aspect or the second aspect of the system and method described above is for the receiver to select a filter bank that is amenable to analyzing the novelty signal, and sending the identity of the analysis filter bank with the coefficients of the inverse filter bank.

Another variant of either the first aspect of the second aspect of the system and method described above is for the first filter bank and the second filter bank to be identical.

The system and method is disclosed in terms of a.

BRIEF DESCRIPTION OF THE DRAWINGS

FIG. 3 comprises Matlab code for implementing a filter bank for the Haar wavelet using the lifting method.

FIG. 4 comprises Matlab code for implementing a filter bank for the Daubechies D4 transform using the lifting method. Matlab code for both forward and inverse lifting are shown.

DETAILED DESCRIPTION

Wavelets and Filter Banks

Figure 1:
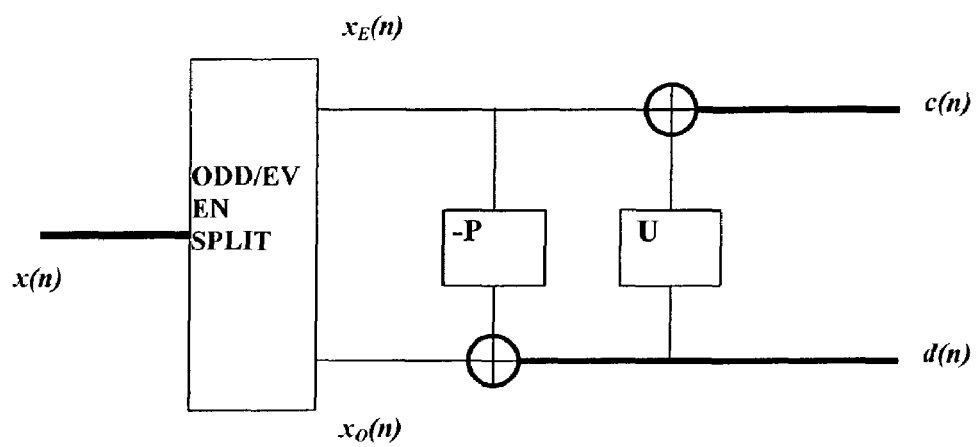
FIG. 1 is a diagram of a single stage of a filter bank.

With respect to FIG. 1, a filter-bank is a mathematical representation and model of actual physical filters used in signal processing; filter banks model filters responding to and interacting with certain aspects of a signal.

Certain kinds of filter banks, such as "quadrature mirror filters" have desirable properties for representing signal processing, wherein signals represented by these filter banks can be compressed and perfectly reconstructed. These filters are also associated with certain functions called wavelets, which are derived from filters using the "cascade algorithm".

A complete discussion of filter banks, wavelets and the mathematical requirements for distortion and alias-free signal construction can be found in *Wavelets and Filter Banks* by Strang and Nguyen.

Computational Environment

Figure 2:
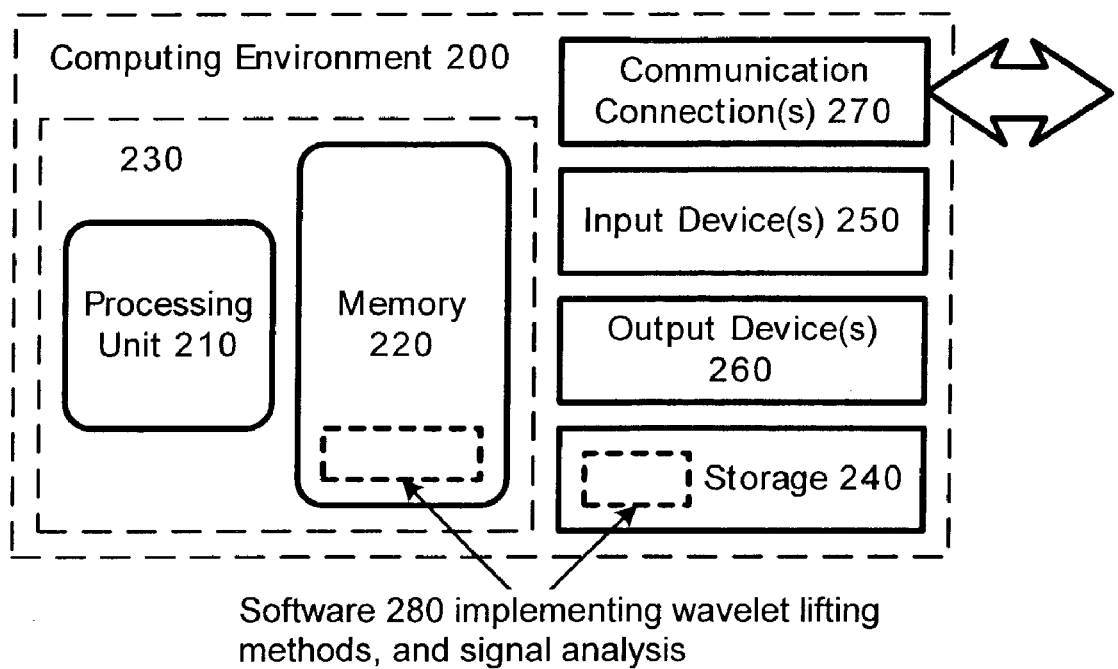
FIG. 2 is a diagram showing possible computing devices for implementing aspects of the system and method disclosed herein.

FIG. 2 illustrates a generalized example of a suitable computing environment 200 in which the disclosed embodiments may be implemented. The computing environment 200 is not intended to suggest any limitation as to scope of use or functionality of the invention, as the present invention may be implemented in diverse general-purpose or special-purpose computing environments.

With reference to FIG. 2, the computing environment 200 includes at least one processing unit 210 and memory 220. In FIG. 2, this most basic configuration 230 is included within a dashed line. The processing unit 210 executes computer-executable instructions and may be a real or a virtual processor. In a multi-processing system, multiple processing units execute computer-executable instructions to increase processing power. The memory 220 may be volatile memory (e.g., registers, cache, RAM), non-volatile memory (e.g., ROM, EEPROM, flash memory, etc.), or some combination of the two. The memory 220 stores software 280 implementing wavelet lifting and associated algorithms required to implement and practice the invention.

A computing environment for other aspects of the invention may have additional features. For example, the computing environment 200 includes storage 240, one or more input devices 250, one or more output devices 260, and one or more communication connections 270. An interconnection mechanism (not shown) such as a bus, controller, or network interconnects the components of the computing environment 200. Typically, operating system software (not shown) provides an operating environment for other software executing in the computing environment 200, and coordinates activities of the components of the computing environment 200.

The storage 240 may be removable or non-removable, and includes magnetic disks, magnetic tapes or cassettes, CD-ROMs, DVDs, or any other medium which can be used to store information and which can be accessed within the computing environment 200. The storage 240 stores instructions for software 280 and data.

The input device(s) 250 may be a touch input device such as a keyboard, mouse, pen, or trackball, a voice input device, a scanning device, or another device that provides input to the computing environment 200. For audio or video, the input device(s) 250 may be a sound card, video card, TV tuner card, or similar device that accepts audio or video input in analog or digital form. The output device(s) 260 may be a display, printer, speaker, or another device that provides output from the computing environment 200.

The communication connection(s) 270 enable the carrier which is modulated by the transmitter and demodulated by the receiver. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment 200, computer-readable media include memory 220, storage 240, communication media, and combinations of any of the above.

The invention can be described in the general context of computer-executable instructions, such as those included in program modules, being executed in a computing environment on a target real or virtual processor. In the disclosed aspects of the invention, program modules are executed for (1) controlling a transmitter and controlling a receiver; (2) modulating a carrier by the transmitter using a signal; (3) analyzing and characterizing the transmission process to determine the relationship of signal distortion to signal structure and content, including computing operators by wavelet lifting to analyze and to invert the effects of signal distortion; (4) constructing and selecting a set of signals, wherein selection and construction is made according to the relationship of signal distortion to signal structure and content, and; (5) encoding a message or part of a message using one of the digital signals selected from the set of digital signals, and decoding a digital signal to derive a message or part of a message.

Generally, program modules include routines, programs, libraries, objects, classes, components, data structures, etc. that perform particular tasks or implement particular abstract data types. The functionality of the program modules may be combined or split between program modules as desired operations performed by a computer, and should not be confused with acts performed by a human being. The actual computer operations corresponding to these terms vary depending on implementation.

The program modules are written in a programming language selected for the particular computer used in the apparatus; the language selected from C, C++, Visual BASIC, Java, assembly language, Fortran and so forth.

It will be appreciated that functions or processes that are described in terms of software can be implemented in hardware devices such as ASICs (application specific integrated circuits), FPGA (field programmable gate arrays) or the like. Similarly, functions or processes that are described as hardware devices can also be implemented in software.

Wavelet Construction by "Lifting"

See either of the following references for a complete discussion of wavelet lifting. (1). I. Daubechies and Wim Sweldens, *Factoring Wavelet Transforms into Lifting Steps*, Journal of Fourier Analysis and Applications, Volume 4, Number 3, 1998. (2). C. Valens, *The Fast Lifting Wavelet Transform*, c.valens@mindless.com)

The one-dimensional discrete wavelet transform DWT represents a real-valued discrete-time signal in terms of shifts and dilations of a low-pass filter or scaling function and a band-pass wavelet function. The DWT decomposition of a signal is multi-scale: at stage j the DWT decomposes a signal into a set of scaling coefficients $c^j(n)$, where n is the sample number of the signal, and represents coarse signal information or coarse detail at the scale level j; and the set of wavelet coefficients, $d^j(n)$, which represents "fine" detail of the signal at the scale j; the signal is recursively decomposed into the two sets of coefficients for scales j=1, 2, 3 . . . N.

The inverse DWT employs inverse filters to reconstruct the signal from the sets of coefficients.

A DWT can be implemented as a predictor-corrector decomposition, in which the scaling coefficients at scale level j are used as predictors for the signal at the next higher or finer level of detail at scale j+1. Wavelet coefficients are the prediction errors between the scaling coefficients and the higher-level signal details the scaling coefficients predict. This interpretation of the DWT leads to the concept of wavelet decomposition by lifting.

The term "lifting" applies to the process of starting with an elementary wavelet and mathematically "lifting the wavelet" to higher complexity, wherein the additional complexity gives the lifted wavelet certain desired properties.

With respect to FIG. 1, the diagram depicts a single stage of the DWT by lifting. Lifting is a spatial or time-domain process for constructing bi-orthogonal wavelets. In the lifting form of the DWT samples of a signal x(n) are decomposed into two sets, and predictor-corrector or update operators, P and U are applied between the two sets of signal values to derive the DWT decomposition.

Lifting Method

Figure 5:
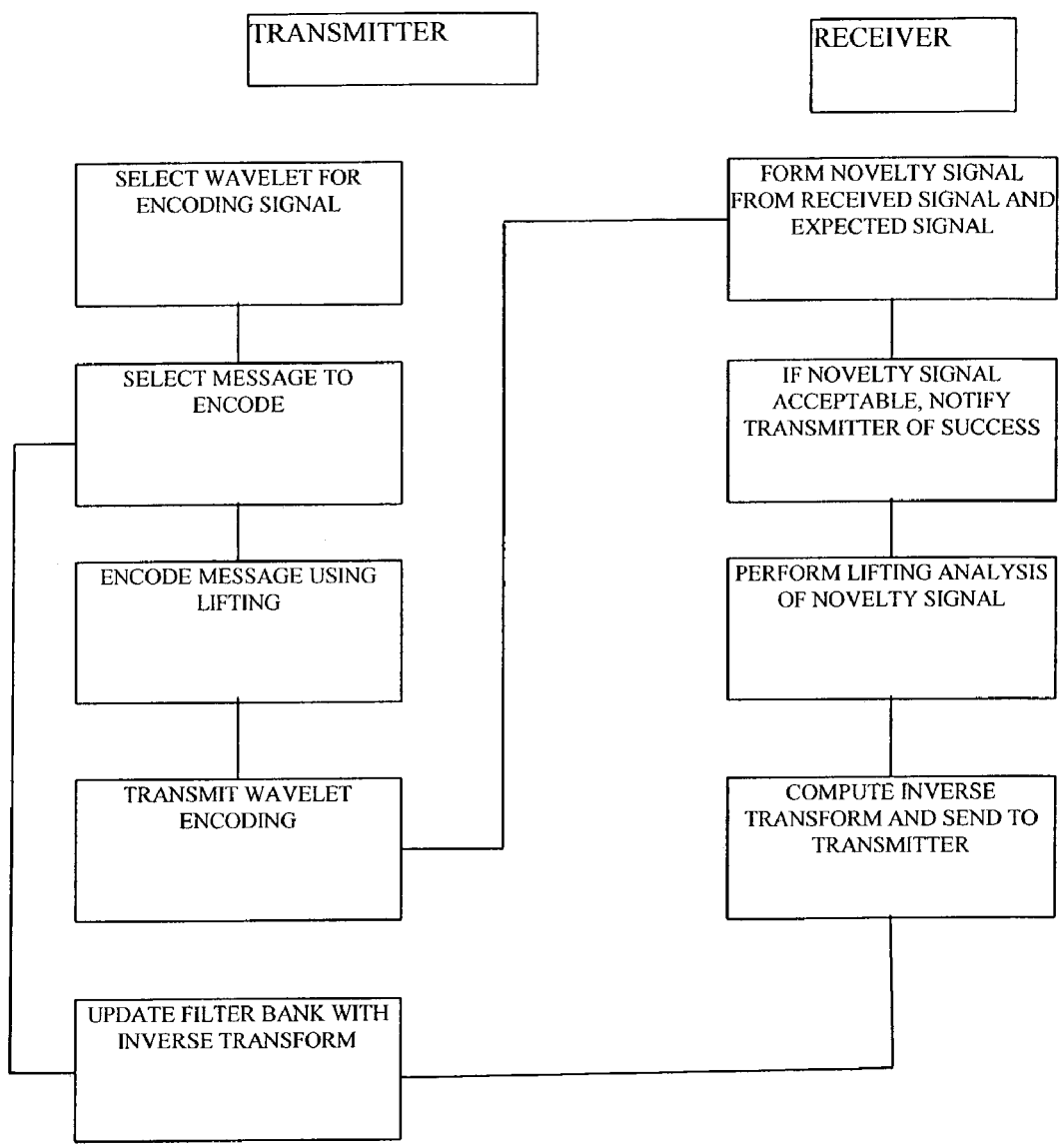
FIG. 5 is flow chart of a first aspect of the invention.

With respect to FIGS. 3, 4 and 5, the lifting method comprises:

1. Divide input x(n) into two disjoint sets, in this example x(n) is divided into an "even" set, where n is an even number and an "odd" set, where n is an odd number.

2. Update $x_E(n)$ and d(n) and compute scaling coefficients to represent a coarse approximation to the original signal x(n); U(d(n)) is the update operator and is usually chosen to be zero when the algorithm is initialized:

$$c(n) = x_E(n) + U(d(n)).  \quad\quad \text{EQN. LA-1}$$

3. Compute wavelet coefficients d(n) as the error in predicting $x_O(n)$ from $x_E(n)$ using the prediction operator, P:

$$d(n) = x_O(n) - P(x_E(n)) \quad\quad \text{EQN. LA-2}$$

Inversion—Generating the Original Signal from the Lifting Coefficients

The original signal is computed from the lifting coefficients by:

$$x_E(n)=c(n)-U(d(n)) \qquad \text{EQN. LA-3}$$

$$x_O(n)=d(n)+P(x_E(n)) \qquad \text{EQN. LA-4}$$

Redundant Lifting

In redundant lifting, an additional prediction is added through the following equation:

$$e(n)=x_E(n)-Q(x_O(n)) \qquad \text{EQN. LA-5}$$

In this equation, the even coefficients are predicted from the odd coefficients. The update equation EQN LA-1 is modified as:

$$c(n)=x_E(n)+V(d(n),e(n)). \qquad \text{EQN. LA-6}$$

Lifting and De-Noising Wavelets

Because wavelet coefficients comprise a compact representation of signals at varying levels of detail, processing of these coefficients provide a simple means of removing noise from a signal. Assume a signal s(n) is corrupted by noise $\zeta(n)$, where s and $\zeta$ are sampled at discrete instances of time n and $\zeta$ is an additive Gaussian source. Samples x(n) of the unknown signal are observed; where:

$$x(n)=s(n)+\zeta(n)$$

The discrete wavelet transform (DWT) of x(n) is computed, and a non-linear threshold, proportional to the standard deviation of the noise, is applied to all coefficients. All coefficients below the threshold are set to zero, for "hard thresholding". For soft thresholding all coefficients below the threshold are set to zero, and all other coefficients are reduced by the threshold amount. The threshold is selected so the thresholding operation leaves the scaling coefficients largely unaffected. If s(n)=0 for all n sampled, and $\zeta$ is pure Gaussian white noise, it can be shown that as the number of sampled points increase, the wavelet thresholding estimator function tends to the zero function with probability one (this basically means that the lifting process can "lock onto" the noise signal; see D. L. Donoho, *Denoising by soft-thresholding*, IEEE Transactions on Information Theory, volume 41, pp. 613-627, 1995). Therefore with the proper adaptive lifting algorithms, noise can be effectively removed from the signal.

Finding Optimal Waveforms by Adaptive Lifting—a First Aspect of the Invention

Lifting will be used to construct a set of base signals that are best suited for a given transmission system. By best suited, it is meant a set of base signals that are maximally discriminable by a receiver in the transmission system. Base signals are constructed in real-time by an adaptive lifting algorithm.

With respect to FIG. 5 the adaptive lifting method for optimal base signal construction comprises:

1. A wavelet, $\omega$, is selected and a message, $\sigma$ is used to encode the wavelet to form a base-band signal $\sigma_\omega$.
2. The base-band signal is either sent over a transmission system T or is used to modulate a carrier $\zeta$ associated with T.
3. The receiver "expects" to receive the signal $\rho_\omega$, however, the signal received is $\lambda$. The signal $\lambda$ is de-noised using soft thresholding to yield the signal $\kappa$.
4. The "novelty signal" or "difference signal" $\delta=\rho_\omega-\kappa$ carries information about the "unexpected" distortion produced by T on $\sigma_\omega$.
5. At the receiver a lifting method is used to analyze the novelty signal, and thereby derive the analysis coefficients of the novelty signal.
6. From the novelty coefficients the inverse filter is computed by the receiver and sent to the transmitter.
7. The transmitter computes an updated filter bank to encode the message. The updated filter bank accounts for the unexpected distortion in the channel in addition to encoding the message.
8. Processing continues according to 2., above. The process may continue until the novelty signal is reduced to an acceptable level or until a certain predefined number of iterations occur.

A Second Aspect

Figure 6:
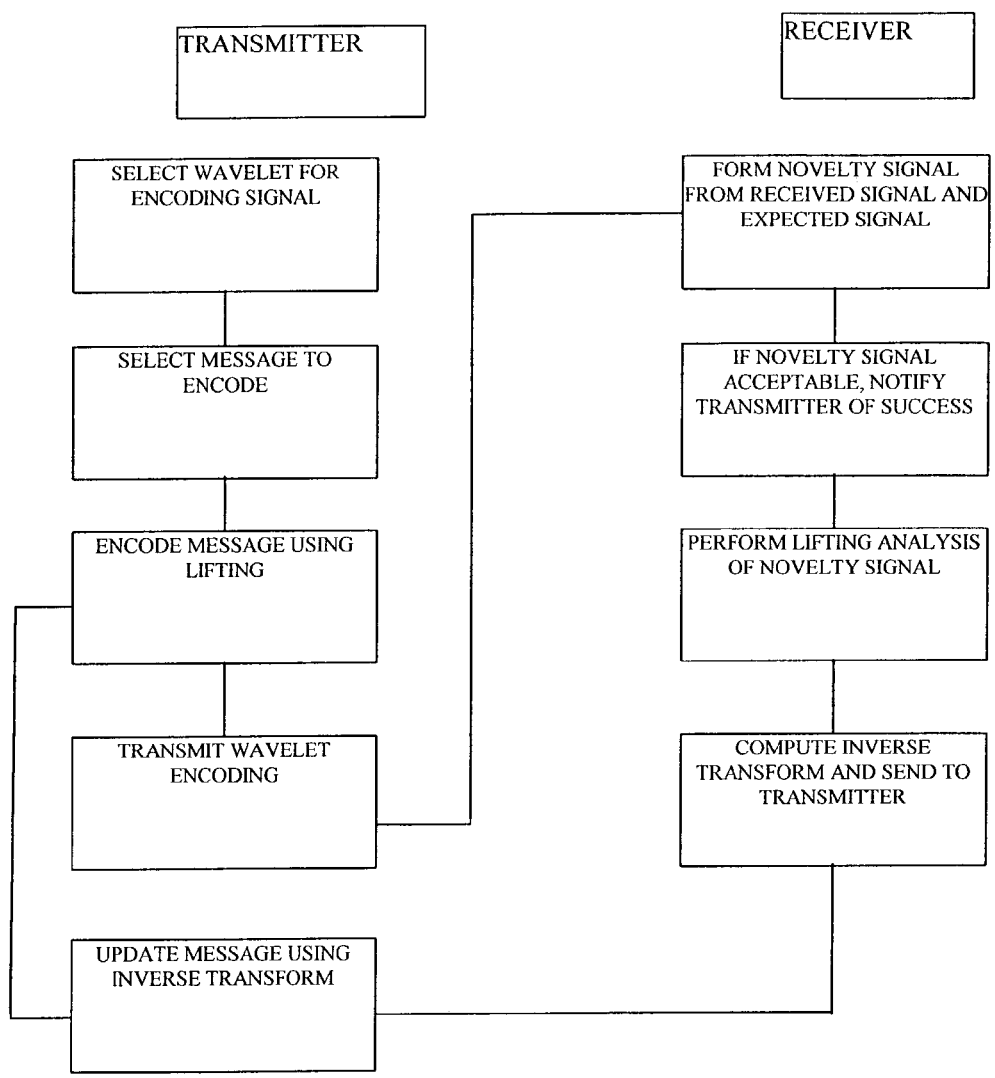
FIG. 6 is a flow chart of a second aspect of the invention.

With respect to FIG. 6 the adaptive lifting method for optimal base signal construction may comprise:

1. A wavelet, $\omega$, is selected and a message, $\sigma$ is used to encode the wavelet to form a base-band signal $\sigma_\omega$.
2. The base-band signal is either sent over a transmission system T or is used to modulate a carrier $\zeta$ associated with T.
3. The receiver "expects" to receive the signal $\rho_\omega$, however, the signal received is $\lambda$. The signal $\lambda$ is de-noised using soft thresholding to yield the signal $\kappa$.
4. The "novelty signal" or "difference signal" $\delta=\rho_\omega-\kappa$ is computed.
5. At the receiver a lifting method is used to analyze the novelty signal, and thereby derive the analysis coefficients of the novelty signal.
6. The coefficients of the novelty signal are used to update the message.
7. The transmitter encodes the wavelet with the updated message. The updated message accounts for the unexpected distortion in the channel.
8. Processing continues according to 2., above. The process may continue until the novelty signal is reduced to an acceptable level or until a certain predefined number of iterations occur.

Having described two aspects of the invention, it will be appreciated that these aspects can be modified in arrangement and detail without departing from these principles. It should be understood that the computer programs, processes, equipment used, or methods described herein are not related or limited to any particular type of computing environment, unless indicated otherwise. Various types of general purpose or special computing environments may be used with or perform operations in accordance with the teachings described herein. Elements of the illustrative embodiments described as software may be implemented in hardware and vice versa.

In view of the many possible embodiments to which the principles of our invention may be applied, I claim as my invention such embodiments as may come within the scope and spirit of the following claims and equivalents thereto.

I claim:

1. An apparatus for correcting channel distortion of a known signal sent by a transmitter and received by a receiver, the apparatus comprising:

a transmitter filter bank for decomposing the message to be sent by the transmitter, the decomposition according to the filter bank, the decomposition comprising transmitter filter coefficients;

a novelty signal computation device for computing a novelty signal given the transmitted signal and the received signal;

a receiver filter bank for decomposing the novelty signal, the decomposition according to the receiver filter bank, the decomposition comprising receiver filter coefficients;

a novelty signal filter coefficient computation device for computing the inverse receiver filter coefficients that represent the novelty signal; and a transmitter coefficient update device for updating the transmitter filter coefficients according to the inverse receiver filter coefficients representing the novelty signal;

whereby the channel distortion is corrected by the updated transmitter filter coefficients.

* * * * *